(12) United States Patent
O' Lenick, Jr. et al.

(10) Patent No.: US 8,273,844 B1
(45) Date of Patent: Sep. 25, 2012

(54) SURFACE MODIFICATION OF KAOLIN

(75) Inventors: Anthony J. O' Lenick, Jr., Dacula, GA (US); Kevin A. O' Lenick, Dacula, GA (US); Andrew J. O' Lenick, Dacula, GA (US)

(73) Assignee: Siltech LLC, Lawrenceville, GA (US)

( * ) Notice: Subject to any disclaimer, the term of this patent is extended or adjusted under 35 U.S.C. 154(b) by 202 days.

(21) Appl. No.: 12/806,625

(22) Filed: Aug. 18, 2010

Related U.S. Application Data

(60) Provisional application No. 61/399,074, filed on Jul. 8, 2010.

(51) Int. Cl.
*C08G 77/04* (2006.01)

(52) U.S. Cl. ............... 528/34; 528/31; 528/25; 428/405

(58) Field of Classification Search .................... 528/31, 528/25, 34; 428/405
See application file for complete search history.

(56) References Cited

U.S. PATENT DOCUMENTS

| 5,068,277 A | 11/1991 | Vukov | |
|---|---|---|---|
| 2007/0071980 A1* | 3/2007 | Kamei et al. | ............ 428/405 |

* cited by examiner

*Primary Examiner* — Kuo-Liang Peng

(57) ABSTRACT

The invention is directed to a kaolin that has the surface modified by reaction with specific silicone compounds. The reaction of these materials result in a kaolin that is (a) less dusty when handled, (b) more flowable, (c) has better dispersibility in oils and in emulsion, resulting in less whitening when applied to skin and improved waterproofing when applied to skin, (d) has better stability in emulsions when dispersed in oils because of the durability of the surface treatment.

14 Claims, No Drawings

SURFACE MODIFICATION OF KAOLIN

RELATED APPLICATIONS

This application claims priority to and benefit of U.S. Provisional Application Nos. 61/399,074, filed Jul. 8, 2010, the disclosure of which are incorporated herein for all purposes.

FIELD OF THE INVENTION

The invention is directed to an previously untreated kaolin that has the surface modified by reaction with specific silicone compounds. The reaction of these materials result in a kaolin that is (a) less dusty when handled, (b) more flowable, (c) has better dispersibility in oils and in emulsion, resulting in less whitening when applied to skin and improved waterproofing when applied to skin, (d) has better stability in emulsions when dispersed in oils because of the durability of the surface treatment.

BACKGROUND OF THE INVENTION

Kaolinite or kaolin is a clay mineral, part of the group of industrial minerals, with the chemical composition $Al_2Si_2O_5(OH)_4$. It is a layered silicate mineral, with one tetrahedral sheet linked through oxygen atoms to one octahedral sheet of alumina octahedra. Rocks that are rich in kaolinite are known as china clay, white clay, or kaolin.

The largest use for kaolin is in the production of paper, including ensuring the gloss on some grades of paper. Commercial grades of kaolin are supplied and transported as dry powder, semi-dry noodle or as liquid slurry.

Kaolin that is well suited as a raw material in the preparation of the compounds of the present invention have the following analysis:

| Ingredients | Weight % |
| --- | --- |
| Whiteness (L value) | 95 |
| Moisture (max. %) | 1.0 |
| LPH (20% solids) | 4.2-5.2 |
| Median Particle Size (microns) | 0.6 |
| Oil Absorption | 40 |
| Wet Screen Residue (% +325 mesh) | <0.03 |
| Index of Retraction | 1.56 |
| Specific Gravity | 2.58 |
| Bulking Value (lb/solid gallon) | 21.66 |
| Brightness (%) | 88 |

Kaolin is insoluble and has excellent absorbent qualities. These qualities are used to draw out impurities and toxins and thereby clears the skin of excess oil, dirt, pollutions and other waste materials. Apart from this, it forms a stable basis for skin masques and can be used on any type of skin.

The cosmetic use of kaolin has been based primarily on its insolubility and ability to absorb water. We on the other hand are interested in the use of kaolin that has been surface treated with a particular type of silicone that can be easily dispersed in oils and can provide water proofing films to skin.

There are many areas in which waterproofing is highly prized. This includes sun care applications, pigmented products and many others where wash off is frowned upon by the consumer. Surface treating the kaolin result in a kaolin that is (a) less dusty when handled, (b) more flowable, (c) has better dispersibility in oils and in emulsion, resulting in less whitening when applied to skin and improved waterproofing when applied to skin, (d) has better stability in emulsions when dispersed in oils because of the durability of the surface treatment.

Surface treated kaolin also can be used to modify cosmetic powders providing enhanced spreadability and improved cosmetic elegance.

Kaolin has very reactive sites. U.S. Pat. No. 6,071,335, incorporated herein by reference, to Braggs issued Jun. 6, 2000 teaches "A method for modifying the surface of kaolinite or a kindred mineral comprises the step of subjecting the mineral to a water vapor plasma. The modification involves the generation of reactive hydroxyl sites on the surface of the kaolinite. The plasma treatment may be followed by treatment with an appropriate chemical reagent to further modify the surface properties of the mineral."

'335 teaches "Kaolin is a common mineral. It is a member of the clay mineral group of phyllosilicates which group also includes talc (or soapstone) and pyrophyllite. Clay minerals similar to kaolinite include dickite, nacrite, anauxite, halloysite, montmorillonite (dominant clay in bentonite), beidellite, nontronite, hectorite, saponite, and illite. Clay minerals similar to talc include minnesotaite.

Kaolin has a wide variety of applications in industry, particularly as a paper filler and a coating pigment. It is used as an extender in aqueous based paints and ink, a functional additive in polymers and is the major component in ceramics. Kaolin is an inexpensive additive, which can improve the properties of the material in which it is dispersed, provided it is able to form stable dispersions. In order to achieve this the surface is usually modified in some way so as to enhance colloid stability in a system whether it be organic, as for polymers, or in aqueous dispersions.

The surface of kaolin, like other clay minerals, is relatively inert, unlike silica and many other minerals. Kaolin has two different basal cleavage faces. One face consists of a siloxane surface with very inert —Si—O—Si— links. The other basal surface consists of an octahedral, gibbsite $[Al(OH)_3]$ sheet. Both of these surfaces are theoretically electrically neutral. At the edges of a platelet and at the surface ridges the lattice is disrupted and broken bonds occur which are accommodated as OH groups. These edges have been estimated to occupy approximately 10% of the whole kaolinite surface.

The hydroxyl groups at the plate edges are considered to be the major reactive sites of clay surfaces including kaolin. Sometimes these groups are porpoxylated by reaction with propylene oxide. This quenches the reactivity but provides little in the alteration of the properties of the clay viz-a-viz dispersibility in oils.

As will become apparent, our approach is to use a reactive silicone with kaolin to not only quench the reactive groups but also to incorporate a variety of groups that are either silicone soluble (siliphillic), fluoro soluble (fluorophillic) or oil soluble (oleophillic). This results in materials that allow for a thin, transparent kaolin film that provides a number of advantageous not present in currently existing products including (a) less dusty when handled, (b) more flowable, (c) has better dispersibility in oils and in emulsion, resulting in less whitening when applied to skin and improved waterproofing values when applied to skin, (d) has better stability in emulsions when dispersed in oils because of the durability of the surface treatment.

The Invention

OBJECT OF THE INVENTION

The present invention is directed to several related aspects of the invention:

One aspect of the invention is directed to a silicone polymer used to surface treat kaolin. The silicone compounds possess oil soluble groups, fluoro soluble groups and/or silicone soluble groups in differing configurations, resulting in a series of products that can be customized to optimize the performance of the kaolin in waterproofing and dispersion applications.

Another aspect is a process for surface treating kaolin with the specific silicone compounds of the resent invention.

Still another aspect is a treated kaolin itself.

Still another is a an emulsion of a surface treated kaolin used for personal care applications for waterproofing properties and in applications like pressed powders where the modification changes the aesthetics of the product.

Other objects of the invention will become clear as the specification is read. All temperatures given are in degrees C., all percentages are percentages by weight, and all references to patents are incorporated herein by reference.

SUMMARY OF THE INVENTION

The invention is directed to a series surface treated kaolin that has been reacted with silicone compounds that render the surface not only hydrophobic, but render the surface siliphillic, fluorophillic or oleophillic. The ability to modify the surface allows for the formation of thin uniform films of kaolin on the skin and improves the performance of the material in waterproofing applications like make up and sun care products.

In order to understand the technology described in this chapter, one first needs to understand the concept of group opposites. This concept was developed recently and explained in terms of Solubility Group Opposite. Simplistically, there were two types of "opposites": oil-soluble and water-soluble. Is a product is water insoluble it is hydrophobic. This assumes a world in which all hydrophilic materials are oil loving.

This assumption is clearly not the case. Now, with the growing availability of organo-silicone and fluoro materials, a new type of "opposite" needs to be introduced. Silicone oil, water, mineral oil and fluorocarbon are ALL insoluble in each other. In other works all are hydrophilic, but none of the other three are soluble in each other.

The compatibility of the kaolin in the various materials that it encounters in cosmetic formulations is key to the film that forms upon dry down. The dispersibility of the surface treated kaolin in the various oils has a profound and heretofore unrecognized effect upon the film integrity and consequently upon the waterproofing performance.

The following terminology needs to be clearly understood and considered in picking a surface treatment and an oil phase in which to formulate a product.

Hydrophobic (water hating) materials can be oleophilic, siliphilic or fluorophilic.

Oleophobic (oil hating) materials may be hydrophilic, siliphilic or fluorophilic.

Siliphobic (silicone hating) materials may be oleophilic, hydrophilic fluorophilic.

Fluorophobic (fluoro hating) materials may be oleophilic, hydrophilic or siliphilic.

DETAILED DESCRIPTION OF THE INVENTION

It has been found that highly effective system for surface coating kaolin makes use of a silicone compound conforming to the following structure:

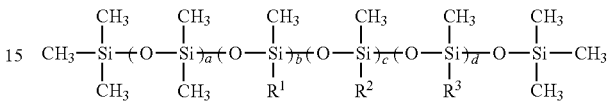

wherein;

$R^1$ is $-(CH_2)_2-Si-(OR^4)_3$;

$R^2$ is $-(CH_2)_e-CH_3$;

$R^3$ is $-(CH_2)_2-(CF_2)_f-CH_3$;

a is an integer ranging from 0 to 100;

b is an integer ranging from 1 to 20;

c is an integer ranging from 0 to 20;

d is an integer ranging from 0 to 20;

e is an integer ranging from 1 to 21;

f is an integer ranging from 6 to 20.

It must be clearly understood that the "b" unit of the compound contains reactive groups that permanently bond to the active sites on the kaolin, permanently altering it.

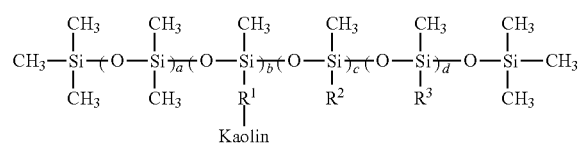

Present Art Coating

It must be clearly understood that the in a preferred embodiment that the number of "b" units range from 2 to 20, that is the molecules has two or more internal reactive groups.

An added benefit of the compounds of the present invention is the ability to modify the ratios of silicone loving group, fluoro loving group and oil loving group in the molecule. Molecules that have only one of the groups present can be easily made if silicone loving groups alone are desired the value of group with the "a" subscript can be nonzero, which the value of the groups with the alkyl portion (the group with the "c" subscript) and value of the group with the fluoro portion (the group with the "d" subscript) can be zero.

A key benefit to the compounds of the present invention is the ability to control the size of the molecules. Lower molecular weight product, those in which a+b+c+d are low numbers, result in molecules with exceptional wetting properties. If the sum a+b+c+d is below 10 good wetting is encountered, meaning the surface coating is efficient. If the sum a+b+c+d is above 20 a very cosmetically elegant feeling film results. This offers the formulator many advantageous in putting together a formulation that the consumer will like and buy.

The control of the values of "a" "c" and "d" are critical to application.

| Group | a | c | d |
| --- | --- | --- | --- |
| Silicone loving | >0 | 0 | 0 |
| Alkyl loving | 0 | >0 | 0 |
| Fluoro loving | 0 | 0 | >0 |

The most interesting compounds are those in which there is more than one group present in the molecule, for example "a" and "c" are both non-zero. The silicone portion will give good spreading due to it's ability to lower surface tension and the oil soluble group will allow for compatibility with oil phases found in many emulsions. If fluoro soluble groups are then introduced, a highly desirable thin film will result.

Pure Dimethicone Compounds

Compounds in which silicone is used as the oil phase the following compounds are of most interest dimethicone based products they are products wherein c is 0 and d is 0.

Pure Alkyl Compounds

Pure alkyl dimethicone compounds are those in which c is an integer ranging from 1 to 20, a is 0 and d is 0.

Pure Fluoro Compounds

Pure fluoro compounds d is an integer ranging from 1 to 20, a is 0 and c is 0.

Alkyl Dimethicone Compounds

Alkyl fluoro compounds d is an integer ranging from 1 to 20, c is 0 and a is an integer ranging from 1 to 100.

Fluoro Alkyl Dimethicone

Fluoro alkyl compounds d is an integer ranging from 1 to 20, a is 0 and b is an integer ranging from 1 to 20.

Multi Component

Multi component compounds
a is an integer ranging from 1 to 100;
b is an integer ranging from 1 to 20;
c is an integer ranging from 1 to 20;
d is an integer ranging from 1 to 20.

Another aspect of the invention is a process for coating kaolin which comprises; contacting kaolin with an effective concentration of a silicone which conforms to the following structure:

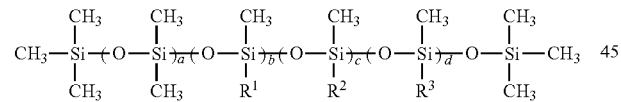

wherein;
$R^1$ is $-(CH_2)_2-Si-(OR^4)_3$;
$R^2$ is $-(CH_2)_e-CH_3$;
$R^3$ is $-(CH_2)_2-(CF_2)_f-CH_3$;
a is an integer ranging from 0 to 100;
b is an integer ranging from 1 to 20;
c is an integer ranging from 0 to 20;
d is an integer ranging from 0 to 20;
e is an integer ranging from 5 to 21;
f is an integer ranging from 6 to 20;
then heating the mixture to a temperature of between 60° C. and 100° C., for two to ten hours.

The effective coating concentration ranges from 0.5% to 10% by weight.

In a preferred embodiment the effective coating concentration ranges from 1% to 5% by weight.

It should be clear from the above that the presence of three R' groups on the silicone compound can result in the formation of a multiple bonds bond between silicone the kaolin crystals. Since no water is present in this process, the kaolin crystals remain intact and "frozen" in shape by the silicone which acts like a matrix for the kaolin crystals. The silicone preserves the structure of the kaolin crystals, eliminates the reactivity in water, and makes them hydrophobic.

The ability to have a surface coated kaolin that is (a) less dusty when handled, (b) more flowable, (c) has better dispersibility in oils and in emulsion, resulting in less whitening when applied to skin and higher waterproofing efficiency when applied to skin, (d) has better stability in emulsions when dispersed in oils because of the durability of the surface treatment are a direct unexpected result of modifying the surface of the kaolin with a specific silicone compound, freezing the structure of the kaolin, surface modifying it and removing the undesired reactivity.

EXAMPLES

Silanic Hydrogen Compounds

The silicone compounds useful for the preparation of the compounds of the present invention were provided by Siltech LLC Dacula, Ga. and conform to the following structures:

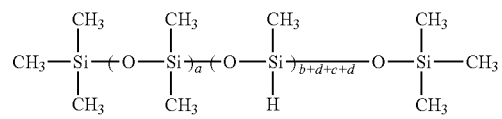

wherein;
a is an integer ranging from 0 to 100;
b+d+c+d is an integer ranging from 1 to 160;

| Example | b + d + c + d | a |
| --- | --- | --- |
| 1 | 1 | 0 |
| 2 | 7 | 5 |
| 3 | 10 | 20 |
| 4 | 50 | 10 |
| 5 | 100 | 50 |
| 6 | 125 | 60 |
| 7 | 160 | 100 |
| 8 | 1 | 5 |
| 9 | 7 | 0 |
| 10 | 10 | 0 |

Vinyl Compounds

Example 11

Vinyl Trimethoxy Silane

Vinyl trimethoxy silane is an item of commerce. It has the following properties:

| Name | Vinyltrimethoxysilane |
| --- | --- |
| Molecular Formula | $C_5H_{12}O_3Si$ |
| Molecular Weight | 148.23 |
| CAS Registry Number | 2768-02-7 |
| EINECS | 220-449-8 |

Alkyl Vinyl Example 12-16

The alkyl compounds used to make the compounds of the present invention are alpha olefins. They are commercially available from a variety of sources and conform to the following structure:

$$CH_3—(CH_2)_x—CH=CH_2$$

x is an integer ranging from 3 to 19;

Upon reaction with SiH the molecule becomes $$Si—(CH_2)_e CH_3$$

e is an integer ranging from 5 to 21;

| Example | x | (ultimate "e" Value) |
|---|---|---|
| 12 | 3 | 5 |
| 13 | 5 | 7 |
| 14 | 9 | 11 |
| 15 | 13 | 15 |
| 16 | 19 | 21 |

Fluoro Vinyl

Fluoro vinyl compounds are an item of commerce available from DuPont. They conform to the following structure:

$$CH_2=CH—(CF_2)_n CF_3$$

| Example | n Value |
|---|---|
| 17 | 5 |
| 18 | 7 |
| 19 | 9 |

Hydrosilylation Procedure

U.S. Pat. No. 5,068,277 to Vukov (incorporated herein by reference) issued Nov. 26, 1991 discloses a procedure for making the compounds of the present invention.

Into a round bottom flask equipped with a mechanical stirrer, water condenser, thermometer and nitrogen inlet is charged the specified number of grams of specified silanic hydrogen compound (Examples 1-10) and 500 grams of xylene, the specified number of grams of vinyl trimethoxy silane (Example 11) and the specified number of grams of the specified alkyl vinyl (examples 12-16) and the specified number of grams of the fluoro vinyl compound (examples 17-19). The resulting mixture is heated to 85 C. and 70 ppm of hexachloroplatinic acid in 1,2-dimethoxyethane was added to the reaction flask. The reaction exotherms to between 10° and 120 C. The reaction mass is held at 130 C. for 4 hours.

After the reaction was complete, the mixture was cooled to 80-90 C. and then neutralized and decolorized with 13.7 grams of granular, 160 mesh, weakly basic anionic exchange resin, i.e. Amberlyst A-21 having a moisture content of less than 5%, an anionic exchange capacity of 1.25 meq/ml and a free dimethylamino functionality bonded to the styrene-divinylbenzene matrix. The mixture was maintained at 80-90.degree. C. under agitation for 15 hours and was then rapidly filtered and stripped of solvent at 100 C. under reduced pressure.

| A. Dimethicone | | | |
|---|---|---|---|
| | Silanic Hydrogen | | Example 11 |
| Example | Example | Grams | Grams |
| 20 | 1 | 224 | 185 |
| 21 | 2 | 136 | 185 |
| 22 | 3 | 224 | 185 |
| 23 | 4 | 78 | 185 |
| 24 | 5 | 99 | 185 |
| 25 | 6 | 97 | 185 |
| 26 | 7 | 107 | 185 |
| 27 | 8 | 595 | 185 |
| 28 | 9 | 83 | 185 |
| 29 | 10 | 76 | 18 |

| B. Alkyl | | | | | |
|---|---|---|---|---|---|
| | Silanic Hydrogen | | Example 11 | Alkyl vinyl | |
| Example | Example | Grams | Grams | Example | Grams |
| 30 | 2 | 136 | 18.5 | 12 | 101 |
| 31 | 3 | 224 | 37.0 | 13 | 112 |
| 32 | 4 | 78 | 55.0 | 14 | 156 |
| 33 | 5 | 99 | 55.0 | 15 | 202 |
| 34 | 6 | 107 | 37.0 | 16 | 269 |

| C. Fluoro | | | | | |
|---|---|---|---|---|---|
| | Silanic Hydrogen | | Example 11 | Fluoro vinyl | |
| Example | Example | Grams | Grams | Example | Grams |
| 35 | 2 | 136 | 18.5 | 17 | 312 |
| 36 | 3 | 224 | 37 | 18 | 357 |
| 37 | 4 | 78 | 55 | 19 | 164 |
| 38 | 5 | 99 | 55 | 18 | 357 |
| 39 | 6 | 97 | 37 | 17 | 312 |

| D. Multi Compound | | | | | | | |
|---|---|---|---|---|---|---|---|
| | Silanic Hydrogen | | Example 11 | Alkyl vinyl | | Fluoro vinyl | |
| Example | Example | Grams | Grams | Example | Grams | Example | Grams |
| 40 | 1 | 224 | 18.5 | 12 | 50 | 17 | 156 |
| 41 | 2 | 136 | 18.5 | 13 | 60 | 18 | 180 |
| 42 | 3 | 224 | 18.5 | 14 | 75 | 19 | 82 |
| 43 | 4 | 78 | 18.5 | 15 | 100 | 17 | 175 |
| 44 | 5 | 99 | 18.5 | 16 | 130 | 18 | 156 |
| 45 | 6 | 97 | 18.5 | 12 | 5 | 19 | 300 |
| 46 | 7 | 107 | 18.5 | 13 | 6 | 17 | 310 |
| 47 | 8 | 595 | 18.5 | 14 | 8 | 18 | 160 |
| 48 | 9 | 83 | 18.5 | 15 | 10 | 19 | 310 |
| 49 | 10 | 76 | 18.5 | 16 | 13 | 17 | 290 |

Surface Treated Kaolin of the Present Invention

Example 30

Kaolin

The kaolin chosen for coating is Kaopolite® Kaolin KR form Imerys. It is not treated.

Kaopolite Kaolin KR is a naturally occurring hydrated aluminum silicate. It has not been propoxylated, that is the reactive groups have not been extinguished by reaction and are available ror reaction with silicone compounds. Careful processing results in soft, fine particles suitable for use in a variety of personal care products. Kaopolite Kaolin KR has been specially designed for formulations where purity, bacteria control, and high whiteness are desired.

Kaopolite Kaolin KR is a naturally occurring hydrated aluminum silicate. Careful processing results in soft, fine particles suitable for use in a variety of personal care products. Kaolin KR has been specially designed for formulations where purity, bacteria control, and high whiteness are desired. It has not been treated with propylene oxide to remove active sites.

Process

The compounds of the present invention are prepared by contacting kaolin with an effective surface coating concentration of a silicone which conforms to the following structure:

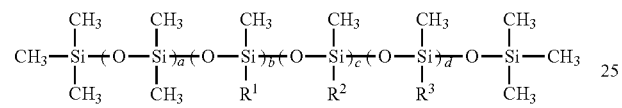

wherein;
$R^1$ is —$(CH_2)_2$—Si—$(OR^4)_3$;
$R^2$ is —$(CH_2)_e$—$CH_3$;
$R^3$ is —$(CH_2)_2$—$(CF_2)_f$—$CH_3$;
a is an integer ranging from 0 to 100;
b is an integer ranging from 1 to 20;
c is an integer ranging from 0 to 20;
d is an integer ranging from 0 to 20;
e is an integer ranging from 5 to 21;
f is an integer ranging from 6 to 20;
then heating the mixture to a temperature of between 60° C. and 100° C., for two to ten hours.

The reaction is considered complete when 97% of the theoretical alcohol is removed. The quantity of alcohol removed is considered more important than the time at which the material is held at temperature.

The effective coating concentration ranges from 0.5% to 10% by weight.

In a preferred embodiment the effective coating concentration ranges from 1% to 5% by weight.

The kaolin is surface treated dry. The silicone can be applied by simply mixing it with the kaolin, or in a preferred method using traditional methods for applying liquids to solids like a "V" blender.

Surface Treatment Procedure

A 600 ml beaker is placed on a hot plate. Into that 250 ml beaker add 100 grams of Kaolin. Using a side sweep stirrer begin agitation. Heat is applied until the temperature reaches between 70-80° C. Slowly add the specified amount of silicone compound (examples 20-49). Continue to mix and hold for 2-4 hours. Allow to cool.

| | Surface Coating | |
|---|---|---|
| Example | Example | Grams |
| 50 | 20 | 2 |
| 51 | 21 | 5 |
| 52 | 22 | 10 |
| 53 | 23 | 6 |
| 54 | 24 | 2 |
| 55 | 25 | 3 |
| 56 | 26 | 5 |
| 57 | 27 | 2 |
| 58 | 28 | 2 |
| 59 | 29 | 2 |
| 60 | 30 | 2 |
| 61 | 31 | 2 |
| 62 | 32 | 2 |
| 63 | 33 | 2 |
| 64 | 34 | 2 |
| 65 | 35 | 2 |
| 66 | 36 | 2 |
| 67 | 37 | 2 |
| 68 | 38 | 2 |
| 69 | 39 | 2 |
| 70 | 40 | 2 |
| 71 | 41 | 2 |
| 72 | 42 | 2 |
| 73 | 43 | 2 |
| 74 | 44 | 2 |
| 75 | 45 | 2 |
| 76 | 46 | 5 |
| 77 | 47 | 5 |
| 78 | 48 | 5 |
| 79 | 49 | 5 |

Dispersions

A. Tri-Octyldodecyl Citrate

The coated kaolin was dispersed at 30% solids in trioctyodecyl citrate. The product is sold commercially as Siltech CE-2000 bt Siltech LLC Dacula, Ga. It has a CAS Number of 126121-35-5

Octyldodecyl Citrate Crosspolymer

Octyldodecyl citrate crosspolymer is sold commercially as CosmoSurf® CE 100 is a new polyester is derived from natural raw materials and is ECOCERT certified.

The dispersion was made using agitation by adding the surface modified kaolin to the citrate esters.

The untreated kaolin former a solid when added. The coated materials were liquid and flowable. The surface coated materials were spread onto the forearm of a volunteer, at 0.25 grams. Surface treated materials were far better waterproofing properties indicating a more uniform film with the coated materials.

The treated kaolin was (a) less dusty than the untreated Kaolin when handled, (b) it was more flowable, (c) it had better dispersibility in oils and in emulsion, resulting in less whitening when applied to skin and improved water proofing when applied to skin, (d) it results in better stability in emulsions when dispersed in oils because of the durability of the surface treatment.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth hereinabove but rather that the claims be construed as encompassing all the features of patentable novelty which reside in the present invention, including all features which would be treated as equivalents thereof by those skilled in the art to which the invention pertains.

We claim:

1. A process for coating the surface of kaolin which comprises contacting kaolin with an effective coating composition of a silicone compound conforming to the following structure:

$$CH_3-Si(CH_3)(CH_3)-(O-Si(CH_3)(CH_3))_a-(O-Si(CH_3)(R^1))_b-(O-Si(R^2)(\phantom{x}))_c-(O-Si(R^3)(\phantom{x}))_d-O-Si(CH_3)(CH_3)-CH_3$$

wherein;
$R^1$ is $-(CH_2)_2-Si-(OCH_3)_3$;
$R^2$ is $-(CH_2)_e-CH_3$;
$R^3$ is $-(CH_2)_2-(CF_2)_f-CH_3$;
a is an integer ranging from 0 to 100;
b is an integer ranging from 1 to 20;
c is an integer ranging from 0 to 20;
d is an integer ranging from 0 to 20;
e is an integer ranging from 5 to 21;
f is an integer ranging from 6 to 20;
then heating the mixture to a temperature of between 60° C. and 100° C., for two to ten hours.

2. A process of claim 1 wherein c is 0 and d is 0.

3. A process of claim 1 wherein c is an integer ranging from 1 to 20, a is 0 and d is 0.

4. A process of claim 1 wherein d is an integer ranging from 1 to 20, a is 0 and c is 0.

5. A process of claim 1 wherein d is an integer ranging from 1 to 20, c is 0 and a is an integer ranging from 1 to 100.

6. A process claim 1 wherein d is an integer ranging from 1 to 20, a is 0 and b is an integer ranging from 1 to 20.

7. A process of claim 1 wherein
a is an integer ranging from 1 to 100;
b is an integer ranging from 1 to 20;
c is an integer ranging from 1 to 20;
d is an integer ranging from 1 to 20.

8. A surface treated kaolin which has been surface treated by a process which comprises contacting kaolin with an effective coating composition of a silicone compound conforming to the following structure:

$$CH_3-Si(CH_3)(CH_3)-(O-Si(CH_3)(CH_3))_a-(O-Si(CH_3)(R^1))_b-(O-Si(R^2)(\phantom{x}))_c-(O-Si(R^3)(\phantom{x}))_d-O-Si(CH_3)(CH_3)-CH_3$$

wherein;
$R^1$ is $-(CH_2)_2-Si-(OCH_3)_3$;
$R^2$ is $-(CH_2)_e-CH_3$;
$R^3$ is $-(CH_2)_2-(CF_2)_f-CH_3$;
a is an integer ranging from 0 to 100;
b is an integer ranging from 1 to 20;
c is an integer ranging from 0 to 20;
d is an integer ranging from 0 to 20;
e is an integer ranging from 5 to 21;
f is an integer ranging from 6 to 20;
then heating the mixture to a temperature of between 60° C. and 100° C., for two to ten hours.

9. A surface treated kaolin of claim 8 wherein c is 0 and d is 0.

10. A surface treated kaolin of claim 8 wherein c is an integer ranging from 1 to 20, a is 0 and d is 0.

11. A surface treated kaolin of claim 8 wherein d is an integer ranging from 1 to 20, a is 0 and c is 0.

12. A surface treated kaolin of claim 8 wherein d is an integer ranging from 1 to 20, c is 0 and a is an integer ranging from 1 to 100.

13. A surface treated kaolin of claim 8 wherein d is an integer ranging from 1 to 20, a is 0 and b is an integer ranging from 1 to 20.

14. A surface; treated kaolin of claim 8 wherein
a is an integer ranging from 1 to 100;
b is an integer ranging from 1 to 20;
c is an integer ranging from 1 to 20;
d is an integer ranging from 1 to 20.

* * * * *